United States Patent [19]
Kent

[11] 3,909,974
[45] Oct. 7, 1975

[54] ARTIFICIAL FISHING LURE

[76] Inventor: Leslie Wayne Kent, 2820 McDonald Rd., Tyler, Tex. 75701

[22] Filed: Dec. 19, 1973

[21] Appl. No.: 426,110

[52] U.S. Cl. .............. 43/42.31; 43/42.37; 43/42.39
[51] Int. Cl.² .......................................... A01K 85/00
[58] Field of Search .............. 43/42.31, 42.37, 42.39

[56] References Cited
UNITED STATES PATENTS

| | | | |
|---|---|---|---|
| 3,169,336 | 2/1965 | Pope | 43/42.37 X |
| 3,344,549 | 10/1967 | Peters et al. | 43/42.37 X |
| 3,497,987 | 3/1970 | Perrin | 43/42.37 X |
| 3,750,323 | 8/1973 | Weis | 43/42.37 X |
| 3,757,455 | 9/1973 | Strader | 43/42.31 X |

*Primary Examiner*—Louis G. Mancene
*Assistant Examiner*—Daniel J. Leach
*Attorney, Agent, or Firm*—Howard E. Moore; Gerald G. Crutsinger

[57] ABSTRACT

An artificial fishing lure having a body with a cavity therein containing a plurality of loose balls or weights which strike the walls of the cavity and rattle for the purpose of attracting fish as the lure is pulled through the water. The body is formed in two halves which snap together around a portion of a fish hook and may be held together by friction or by an adhesive. A common plastic worm, grub, bug, or the like, may be used on the lure. A modified form of the lure is provided with a sinker weight on the shank of the hook abutting the body to assure that the lure sinks in the water at a proper rate of speed and in a proper position.

10 Claims, 10 Drawing Figures

U.S. Patent  Oct. 7,1975  3,909,974
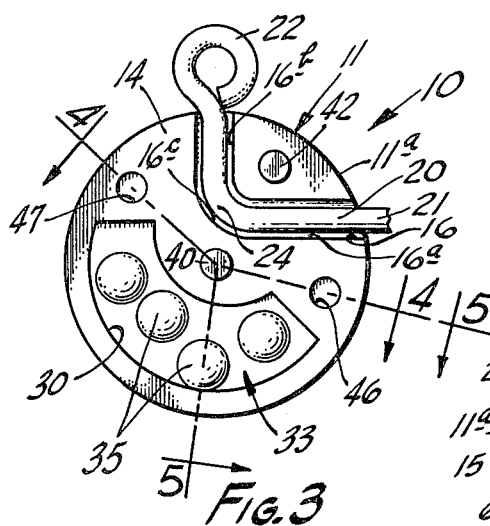
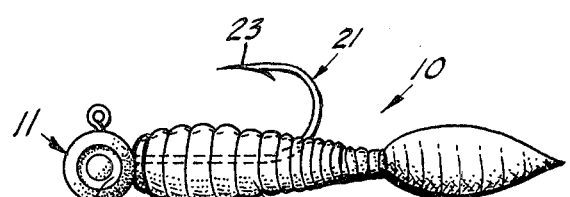
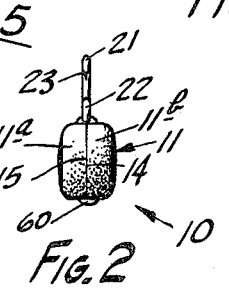
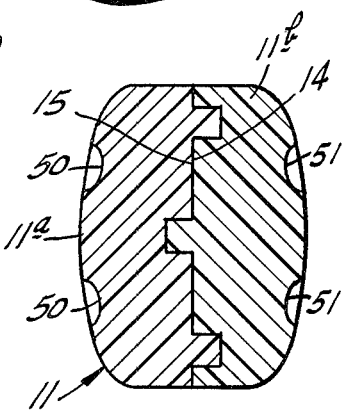
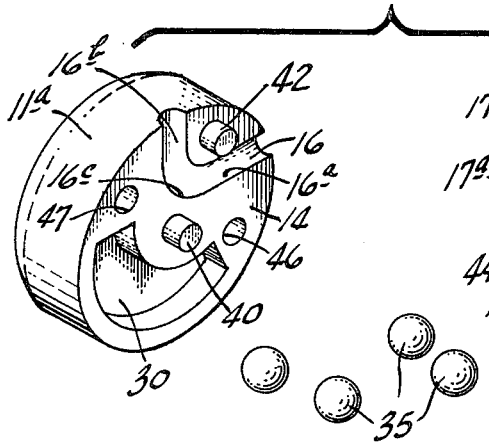
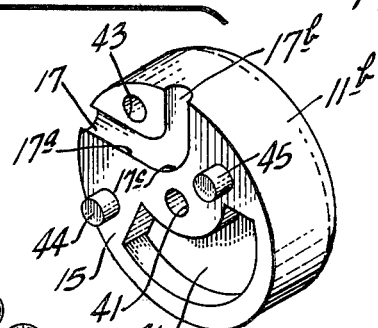
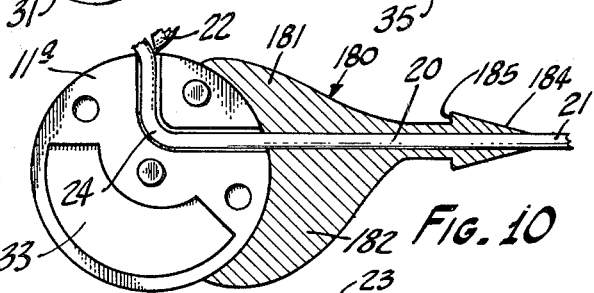
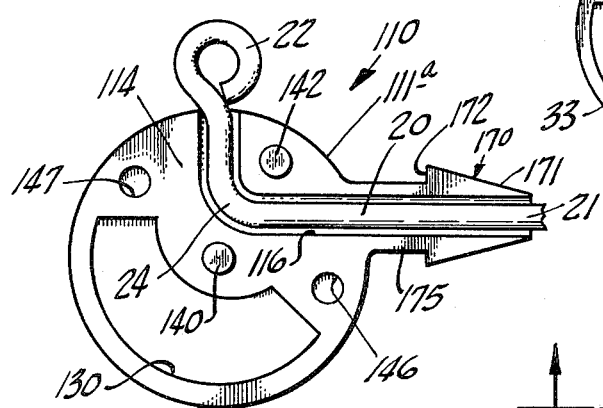
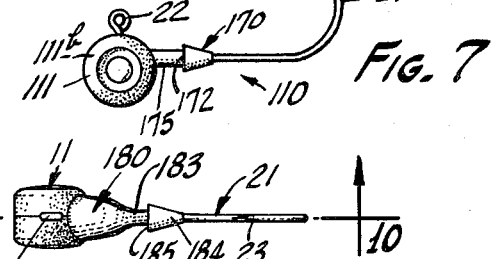
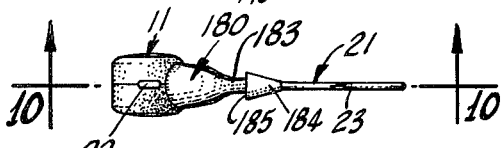

ARTIFICIAL FISHING LURE

This invention relates to artificial fishing lures and more particularly to an improved jig lure having means therein for making noise as it is dragged through water so that fish will be attracted thereto.

An important object of this invention is to provide an artificial jig lure having a weighted body for causing the lure to sink head down in water so that it will resemble natural bait.

A particular object is to provide such a lure wherein the body has an internal hollow or cavity having a plurality of loose rattler weights or balls therein which may be moved in the hollow by the fisherman jiggling or erratically moving the lure for producing a rattle as the lure is pulled through the water.

A further object is to provide such a lure which may have plastic grubs, worms, crickets, shrimp, small fish, or the like artificial bait affixed thereto, and which can be readily maneuvered in water so that its action imitates that of such worm, grub, small fish, or the like.

A still further important object of the invention is to provide a jig lure having a body formed of a sound transmitting material for contacting the water to more readily transmit the rattling sound of the weights in the hollow of its body striking the walls of the hollow as the lure is jiggled by the fisherman.

Still another object is to provide a lure wherein the body and hook are so assembled that the hook is maintained in fixed relation to the body.

Another object is to provide a lure which is easy and economical to manufacture and assemble and easy to maintain.

Additional objects and advantages of the invention will be readily apparent from the reading of the following description of a device constructed in accordance with the invention, and reference to the accompanying drawings thereof, wherein:

FIG. 1 is a side elevational view of an artificial fishing lure constructed in accordance with the invention and showing a plastic grub bait thereon;

FIG. 2 is a front elevational view of the lure of FIG. 1;

FIG. 3 is an enlarged elevational view of one of the halves of the body of the lure of FIGS. 1 and 2, the other half being removed;

FIG. 4 is a cross-sectional view through the lure body taken along the line 4 — 4 of FIG. 3;

FIG. 5 is a cross-sectional view through the lure body taken along the line 5 — 5 of FIG. 3;

FIG. 6 is an enlarged exploded perspective view of the body of the lure of FIGS. 1 through 5 with its halves separated and the rattler weights removed from the body cavity;

FIG. 7 is a view similar to FIG. 1 showing a modified form of the lure body;

FIG. 8 is a view similar to FIG. 3 showing one of the halves of the body of the lure of FIG. 7;

FIG. 9 is a top plan view of a further modified form of the lure, showing a weight member secured on the shank of the hook abutting the lure body; and, FIG. 10 is a longitudinal sectional view taken on the line 10 — 10 of FIG. 9.

In FIGS. 1 through 6 of the drawings, the numeral 10 indicates generally a fishing lure having a body 11 which is preferably suitably molded of synthetic resins or the like. The body 11 is preferably formed in two substantially circular halves or side sections 11a and 11b, respectively, having inner substantially planar mating abutting surfaces 14 and 15, respectively. A substantially L-shaped groove 16 is formed in the surface 14 of the side section 11a, and a corresponding mating L-shaped groove 17 is formed in the surface 15 of the side section 11b. Each of the grooves is substantially semicircular in cross section and, when the halves of the body are disposed with the surfaces 14 and 15 abutting, the grooves 16 and 17 define an L-shaped cylindrical hook shank receptacle extending from the upper edge of the body downwardly thereinto and outwardly through the rear edge. The receptacle thus has a horizontal arm section and a vertical arm section joined by an arcuate central portion, the horizontal portion of the receptacle being formed by the horizontal portions 16a and 17a of the grooves 16 and 17, the vertical portions of the receptacle being formed by the vertical sections 16b and 17b of the grooves 16 and 17, and the arcuate central portion of the receptacle being formed by the arcuate central sections 16c and 17c of the grooves 16 and 17, respectively. When the two halves of the lure body are fitted together with the surfaces 14 and 15 abutting, the receptacle is adapted to enclose and confine the bent shank 20 of a hook 21 having an eye 22 at one end and a barb 23 at the opposite end. The shank of the hook is bent in an L-shape to conform to the shape of the grooves 16 and 17 in the body halves, the bend 24 being formed at a point in the shank which will permit the eye 22 to be disposed just beyond the upper ends of the vertical portions 16b and 17b of the grooves 16 and 17 in the body, as clearly shown in FIG. 3. The engagement of the bent shank of the hook in the receptacle formed by the grooves 16 and 17 securely positions the hook with respect to the body of the lure and holds the body in place on the hook in the desired position. The body can neither revolve nor can it slide longitudinally along the shaft. Neither can the hook slide out of the body.

The inner faces or surfaces 14 and 15 of the body sections 11a and 11b, respectively, are formed with complimentary coengageable pins and sockets by means of which the side sections may be joined together in desired relationship to form the body 11. As clearly shown in FIGS. 4, 5 and 6, a central pin 40 and a central aperture or socket 41 are formed in the opposing faces 14 and 15 and the pin is adapted to enter the aperture to position the halves of the body with respect to each other. Similarly, a pin 42 is formed in the body projecting from the surface 14 of the body half 11a in the space between the legs 16a and 16b of the groove 16 therein and a mating socket or aperture 43 is formed in the surface of the body section 11b for receiving the pin 42 to accurately match the L-shaped grooves 16 and 17 in the two body halves. Additional pins 44 and 45 are formed on the surface 15 of the body half 11b to project vertically therefrom and are disposed to engage in sockets 46 and 47 in the body half 11a to further assist in holding the body halves in proper position and to provide a means for joining the halves against separation or displacement. The pins and sockets may be designed for a snap or a frictional fit, or suitable sealing adhesive may be applied to the abutting faces of the halves 11a and 11b for holding the same together in sealed fixed relationship.

An arcuate recess or cavity 30 is formed in the body half 11 opening through the surface 14 of the body half.

The recess extends, as shown, a substantial distance around the pin 40 in an arc of from 90° to 145°. The mating recess 31 formed in the body half 11*b* is coextensive arcuately with the recess 30, so that when the halves are joined together an elongate arcuate recess or rattler cavity 33 is formed in the body between the two side halves. A plurality of spherical weight members or balls 35 having diameters less than the width and depth of the recess or cavity 33 are disposed in the recess and are adapted to engage the side and bottom walls of the recess when the lure body is shaken or agitated to cause a rattling sound. While four balls are shown, obviously more or fewer may be utilized. The balls will collide with one another and with the walls of the body cavity to produce a distinct rattling sound as the lure is used. Since the lure is made of a rigid sound conducting material such as hard resin plastic, the water in contact with the exterior thereof will receive the sound vibrations as the balls strike the walls of the cavity or recess to produce a sharp clearly audible rattle or sound in the water to attract fish.

The balls are preferably formed of a corrosion resistant metal such as stainless steel, brass or the like, and add some weight to the body of the lure replacing the weight lost when the recess 33 is formed.

In assembling the lure, the bent portion 24 of the fish hook shank 20 is placed in the L-shaped groove 16 in the surface 14 of the side section 11*a* and the four balls 35 are placed in the arcuate recess 30, as shown in FIG. 3, after which the side section 11*b* is brought into mating registry with the side section 11*a*, the surfaces 14 and 15 thereof facing each other. The two side sections are then brought into tight engagement so that the pins 40, 42, 44 and 45 enter and engage in their respective sockets 41, 43, 46 and 47. An adhesive or bonding agent is applied to the mating surfaces, particularly surfaces 14 and 15, to bond the two side sections together firmly. Such treatment will also seal the body cavity 33 against the entry of water therein so that the movement of the balls will not be slowed down by liquid, thus assuring the generation of a better or more desirable rattle when the lure is shaken or suddenly changed in its course through the water.

The outer side of the side section 11*a* may be provided with a shallow circular-like circular groove 50 and, similarly, the outer surface of the side section 11*b* may be provided with a similar groove 51. These grooves may be filled with coloration which contrasts with the coloration of the side sections, so that the lure body appears to have a pair of large eyes. If, for instance, the side sections are molded of a light colored plastic, the grooves 50 and 51 could be coated or filled with dark pigmented material such as black or red plastic, acrylic paint, or the like.

A plastic artificial bait 60, which may be any one of the several types readily available in most domestic bait shops, and which may be a plastic grub or a worm, may be placed on the fish hook in the usual manner by sticking the hook axially through the head end of the bait and out the side, somewhat as shown in FIG. 1, and moved to a position on the hook with its head end abutting the rear edge of the body 11. When the lure is dragged through the water, alternately fast and then slow or with intermittant pauses, or is jiggled so that the lure appears to come alive or to imitate the actions of a live bait, the balls 35 in the cavity 33 will rattle, sending out vibrations or sound waves through the water to attract fish to take or strike the artificial lure.

A modified form of lure 110 having a body 111 is illustrated in FIG. 7, and differs from the lure body 11 by being provided with a rearwardly extending projection 170 which surrounds the hook shank 20 and is adapted to receive and retain an artificial bait such as the grub 60, or a bacon rind or skirt (not shown).

The lure body 111 is formed of two side sections 111*a* and 111*b* substantially identical to those of the lure 10. In FIG. 8 it will be seen that the side section 111*a* is formed with a flat inner surface 114 in which is formed an L-shaped groove 116 adapted to receive the bent shank or shaft 20 of the fish hook 21, and an arcuate recess 130 adapted to receive a plurality of rattler weights or balls (not shown) identical to the balls 35 of the lure 10, for performing the identical functions. Also, the two mating side sections 111*a* and 111*b* are provided with pins and sockets like those provided in the lure 10 so that the two side sections may be attached to each other. The side section 111*a* is provided with a centrally located pin 140 and another like pin 142 located between the legs of the groove 116 near the outer edge of the side section. The side section 111*b* is provided with corresponding mating sockets (not shown) for receiving these pins. Similarly, the side section 111*a* is provided with two sockets 146 and 147 for receiving corresponding mating pins (not shown) provided on the side section 111*b*.

The side section 111*a*, as seen in FIG. 8, has the rearwardly extending projection 170 located as to permit the horizontally disposed leg 116*a* of the L-shaped groove 116 to extend outwardly centrally therealong.

The projection 170 has a rearwardly tapered spear head surface 171 formed with a forwardly facing abrupt retaining shoulder 172, for holding the artificial bait securely thereon closely adjacent the lure body 111.

After the hook 21 is set in place with the bent portion 24 of its shank disposed in the L-shaped groove 116, the balls 35 are placed in the recess 130 and the side sections 111*a* and 111*b* are assembled together and bonded with their pins engaging their corresponding sockets, the lure will appear as shown in FIG. 7. A tubular skirt, worm or grub (not shown), such as the grub 60, may be telescoped over the barbed portion 23 of the fish hook 21, and telescoped over the rearward projection until the artificial bait is engaged into the groove 175 formed between the main portion of the body and the retaining shoulder 172. The bait will extend rearwardly and surround and partially hide the fish hook to improve the fish attraction of the lure. The sound of the rattling weights in the body cavity and the sight of the attached artificial bait attract and entice fish to take the lure.

The body 111 of the lure may also be provided with circular-like grooves on its lateral sides to resemble eyes and they may be colored to contrast well with the color of the body.

A further modified form of the lure is shown in FIGS. 9 and 10, wherein the lure body 11 of the form first described has the hook 21 mounted therein in the usual manner. However, in this form, a weight member 180, which may be formed of lead or other suitable material, is molded or otherwise secured around the shank 20 of the hook in abutment with the rear edge of the lure body, as shown in FIG. 10. The weight member has an upper convexly bulbous portion 181 and a lower more convexly bulbous portion 182, which tightly surround the shank of the hook and abut the circular rear edge of the lure body. These bulbous portions also taper and curve rearwardly from the lure body to a reduced cylindrical stem portion 183 from which a spear head shaped retainer portion 184 projects still further rearwardly and provides a retaining shoulder 185 next to the stem portion 183. The stem or spear head provide means for securely holding artificial bait on the lure in proper position relative to the body and hook.

The bulbous portions of the weight member 180 add means to the lure at a position along the shank or shaft of the hook which causes the lure body 11 at the forward end of the lure to sink in the water more rapidly than the rear or barb end of the hooks of the lure. Any plastic artificial bait mounted on the hook will tend to sink more slowly, so that the body sinks first and more closely imitates natural bait, and also facilitates production of the rattling sound as the front end of the lure is lifted. The weight added to the lure by means of the weight member is such as to cause the lure to sink in the water at the rate of about 10 feet in about 4 to 5 seconds.

The balls in the recess or cavity 33 of the lure body will cause a rattling sound in the water, which is not affected by the addition of the weight member, since the cavity 33 in the body is not enclosed by the weight member, and the sound of the rattling balls striking the sides of the cavity of the body is transmitted without interference directly to the water.

Thus, an artificial fish lure has been provided which fulfills all of the objects of the invention as set forth hereinabove. The L-shaped bend in the shaft of the hook and the L-shaped groove in the body cooperate to hold the hook in the desired relationship to the body; the balls or weight in the arcuate body cavity serve to help weight the lure to the desired density and, more importantly, as the lure wiggles in the water they strike each other and the surrounding cavity surfaces to produce the desired sound waves. The lure can be used with an artificial worm or other bait to present the desired appearance, which appearance is enhanced by the provision of eye-like markings on the sides of the body. The body is composed of two halves which are readily and economically moldable of synthetic, plastic resins which may be colored as desired. In addition, the two body side sections are easy to assemble about the hook shaft and the weights, and are bonded to secure the two body halves together and to seal the body cavity against the entry of water thereinto to keep the rattler cavity dry and thus, to insure proper and free rattling of the weights therein.

It will also be seen that retaining means has been provided on the lure for securely holding the artificial bait in proper position on the lure hook.

Further, it is important to note that a weight member has been provided which adds means to the lure closely adjacent the plastic lure body and causes the forward end of the lure to sink more rapidly than the rear or hook end, and so positions the lure that lifting the same in the water by the fishing line will more readily agitate the balls in the cavity in the plastic body and produce a more noticeable rattling sound; and the weight member also causes the lure to sink at a desired rate in the water.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. An artificial fishing lure comprising: an elongate hook having a shank with an eye at one end and a barbed portion at the other end, said hook shank being abruptly bent near said eye; two complementary lure body halves, each having abutting faces with attaching means thereon coengageable with complementary attaching means on the other body half for securing the body halves together to form a lure body; L-shaped groove means formed in the abutting faces of the body halves to receive the abrupt bend in the hook shank when said body halves are attached to each other about said hook shank, said body having a body cavity formed therein; and rattler means loosely carried in said body cavity whereby when said lure body is manipulated in water said rattler means repeatedly collides with the walls of said cavity to produce a rattling noise.

2. The lure of claim 1 wherein said rattler means is a plurality of sphere-like pellets.

3. The lure of claim 1, wherein the body is provided with means for retaining artificial bait on the lure.

4. The lure of claim 1 wherein said body is formed with a rearwardly extending projection having an enlargement near its outer end forming an abrupt forwardly facing shoulder for retaining artificial bait telescoped thereover and engaged with said shoulder of said enlargement.

5. The lure of claim 4 in combination with an artificial worm having a portion of its body engaged about said hook shaft.

6. A lure of the character set forth in claim 1 wherein the lure body is formed of a hard plastic material.

7. A lure of the character set forth in claim 6 wherein the rattler means comprise metallic spheres substantially smaller than the cavity in the body.

8. An artificial fishing lure comprising: an elongate hook having a shank with an eye at one end and a barbed portion at the other end, said hook shank being abruptly bent near said eye; a lure body mounted on the hook with the abruptly bent portion of said hook shank secured in said body; said body having a body cavity formed therein; rattler means loosely carried in said body cavity whereby when said lure body is manipulated in water said rattler means repeatedly collides with the walls of said cavity to produce a rattling noise; and a weight member secured on the shank of the hook abutting the lure body ahead of the barbed end of the hook for causing the lure body to sink in the water.

9. A lure of the character set forth in claim 8 wherein the weight member is provided with retaining means on the end thereof opposite the lure body for securing artificial bait on the lure.

10. An artificial fishing lure comprising: an elongate hook having a shank with an eye at one end and a barbed portion at the other end, said hook shank being abruptly bent near said eye; a lure body mounted on the hook with the abruptly bent portion of said hook shank secured in said body; said body being formed of hard plastic in two complementary substantially cylindrical body halves, each having substantially planar mating abutting faces with opposed complementary pin and socket members on said abutting faces disposed to be coengageable for securing the body halves together; complementary L-shaped groove means formed in the abutting faces of the body halves forming an L-shaped groove in said body to receive the abrupt bend portion of the hook shank near the hook eye when said body halves are secured to each other about said hook shank; said body having an arcuate cavity formed therein by mating complementary arcuate recess portions formed in the abutting faces of the body halves spaced from said L-shaped groove, whereby said recess is separated from said L-shaped groove and when the halves are secured together said recess is sealed off from said groove; adhesive means on the abutting faces of said body halves securing said halves together; and rattler means comprising one or more pellets loosely carried in said body cavity whereby when said lure body is manipulated in water said rattler means repeatedly collides with the walls of said cavity to produce a rattling noise.

* * * * *